United States Patent
Shiga et al.

(10) Patent No.: US 8,422,985 B2
(45) Date of Patent: Apr. 16, 2013

(54) MOBILE TELEPHONE

(75) Inventors: Noritake Shiga, Northridge, CA (US); Makoto Kato, Higashi-Osaka (JP)

(73) Assignee: Kyocera Corporation, Kyoto (JP)

( * ) Notice: Subject to any disclaimer, the term of this patent is extended or adjusted under 35 U.S.C. 154(b) by 1079 days.

(21) Appl. No.: 11/730,006

(22) Filed: Mar. 29, 2007

(65) Prior Publication Data

US 2007/0232259 A1    Oct. 4, 2007

(30) Foreign Application Priority Data

Mar. 30, 2006    (JP) .................................. 2006-093210

(51) Int. Cl.
*H04M 11/04*    (2006.01)

(52) U.S. Cl.
USPC ......................................... 455/404.1; 379/37

(58) Field of Classification Search ............... 455/404.1, 455/404.2, 521; 379/37
See application file for complete search history.

(56) References Cited

U.S. PATENT DOCUMENTS

| | | | |
|---|---|---|---|
| 6,889,135 B2* | 5/2005 | Curatolo et al. | 701/207 |
| 2003/0224803 A1* | 12/2003 | Konno | 455/456.1 |
| 2005/0169248 A1* | 8/2005 | Truesdale et al. | 370/352 |
| 2005/0243973 A1* | 11/2005 | Laliberte | 379/37 |
| 2006/0115057 A1* | 6/2006 | Laliberte | 379/37 |
| 2007/0003024 A1* | 1/2007 | Olivier et al. | 379/45 |

FOREIGN PATENT DOCUMENTS

| | | |
|---|---|---|
| JP | 2001-308910 A | 11/2001 |
| JP | 2003-110752 | 4/2003 |
| JP | 2004-228705 | 8/2004 |
| JP | 2005-341302 | 12/2005 |
| WO | WO-2005/022939 | 3/2005 |

OTHER PUBLICATIONS

Office Action from Japanese Patent Application No. 2006-093210, mailed on Nov. 2, 2010.

* cited by examiner

*Primary Examiner* — Ajit Patel
*Assistant Examiner* — Myron K Wyche
(74) *Attorney, Agent, or Firm* — Duane Morris LLP (57) ABSTRACT

A mobile telephone 2 stores a telephone number and address for data communication of an emergency service in a storage unit, and has a function for acquiring position information showing its own position. If the mobile telephone 2 is outside the range of a 1× network 4 when a telephone number of another party is designated, the mobile telephone 2 checks whether or not the designated telephone number is a telephone number of an emergency service. When the designated telephone number is confirmed to be the telephone number of an emergency service, the mobile telephone 2 retrieves the address of the emergency service from the storage unit, and sends an emergency notification that includes the position information over the EVDO network 5 with the retrieved address as the destination. The emergency notification message reaches a server 3b of the emergency service via the EVDO network 5.

6 Claims, 5 Drawing Sheets

| REGISTRATION NUMBER | NAME | TELEPHONE NUMBER | ADDRESS |
|---|---|---|---|
| 1 | POLICE STATION | 110 | police-station@keisatsu.com |
| 2 | FIRE SERVICE | 119 | fire-service@shobo.com |
| | | | |

MOBILE TELEPHONE

This application is based on application No. 2006-093210 filed in Japan, the content of which is hereby incorporated by reference.

BACKGROUND OF THE INVENTION (1) Field of the Invention

The present invention relates to a technique for improving operations in a mobile telephone when performing voice communication.

(2) Description of the Related Art

The CDMA 2000 standard, a mobile telephone system that uses CDMA (Code Division Multiple Access) technology, includes in its family of standards 1×EVDO (Evolution Data Only), with the EVDO standard being compatible only with data communication.

In a 1×EVDO-enabled mobile telephone, data communication is preferably performed over an EVDO network using the EVDO standard, whereas voice communication is performed over a 1× network using the 1× standard. When the mobile telephone is outside the range of the EVDO network, data communication is also performed over the 1× network using the 1× standard.

Take an example of the user's mobile telephone being outside the range of the 1× network and within the range of the EVDO network. Under this circumstance, the user designates a telephone number of another party and performs a call operation in an attempt to carry out voice communication. The user's mobile telephone will not be able to connect to the mobile telephone of the other party because it is outside the range of the 1× network.

One conceivable way to deal with this situation is for the user state his business in an e-mail, and send the e-mail to the mobile telephone of the other party using the EVDO network.

The telephone number designated by the user may, for instance, be an emergency telephone number of an emergency service. In this case, the user must not only compose the main body of the e-mail outlining the situation and input the e-mail address, but also include information in the main body allowing those at the emergency service to ascertain the current whereabouts of the user.

Note that the term emergency service denotes police, fire service, or the like, with examples of emergency telephone numbers being "110" for police and "119" for fire service in Japan, and "911" in the United States of America.

SUMMARY OF THE INVENTION

A mobile telephone of the present invention is a mobile telephone including a voice communication function for performing voice communication and a data communication function for performing data communication, the mobile telephone including: a storage unit operable to store a telephone number and an address for the data communication function; a retrieval unit operable to retrieve the stored address from the storage unit, in a case of voice communication not being possible when the voice communication is attempted to the stored telephone number; and an execution unit operable to cause a message to be transmitted by way of the data communication function using the retrieved address as a destination.

A notification method of the present invention is a notification method used by a mobile telephone that includes a voice communication function for performing voice communication and a data communication function for performing data communication, the notification method including: a retrieval step of retrieving an address for the communication function from a storage unit operable to store a telephone number and the address, in a case of voice communication not being possible when the voice communication is attempted to the stored telephone number; and an execution step of causing a message to be transmitted by way of the data communication function using the retrieved address as a destination.

A notification program of the present invention is a notification program used in a mobile telephone that includes a voice communication function for performing voice communication and a data communication function for performing data communication, and a storage unit operable to store a telephone number and an address for the data communication function, the notification program causing the mobile telephone to function as: a retrieval unit operable to retrieve the stored address from the storage unit, in a case of voice communication not being possible when the voice communication is attempted to the stored telephone number; and an execution unit operable to cause a message to be transmitted by way of the data communication function using the retrieved address as a destination.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

The following describes an embodiment of the present invention with reference to the drawings.

Mobile Telephone System Structure

Figure 1:
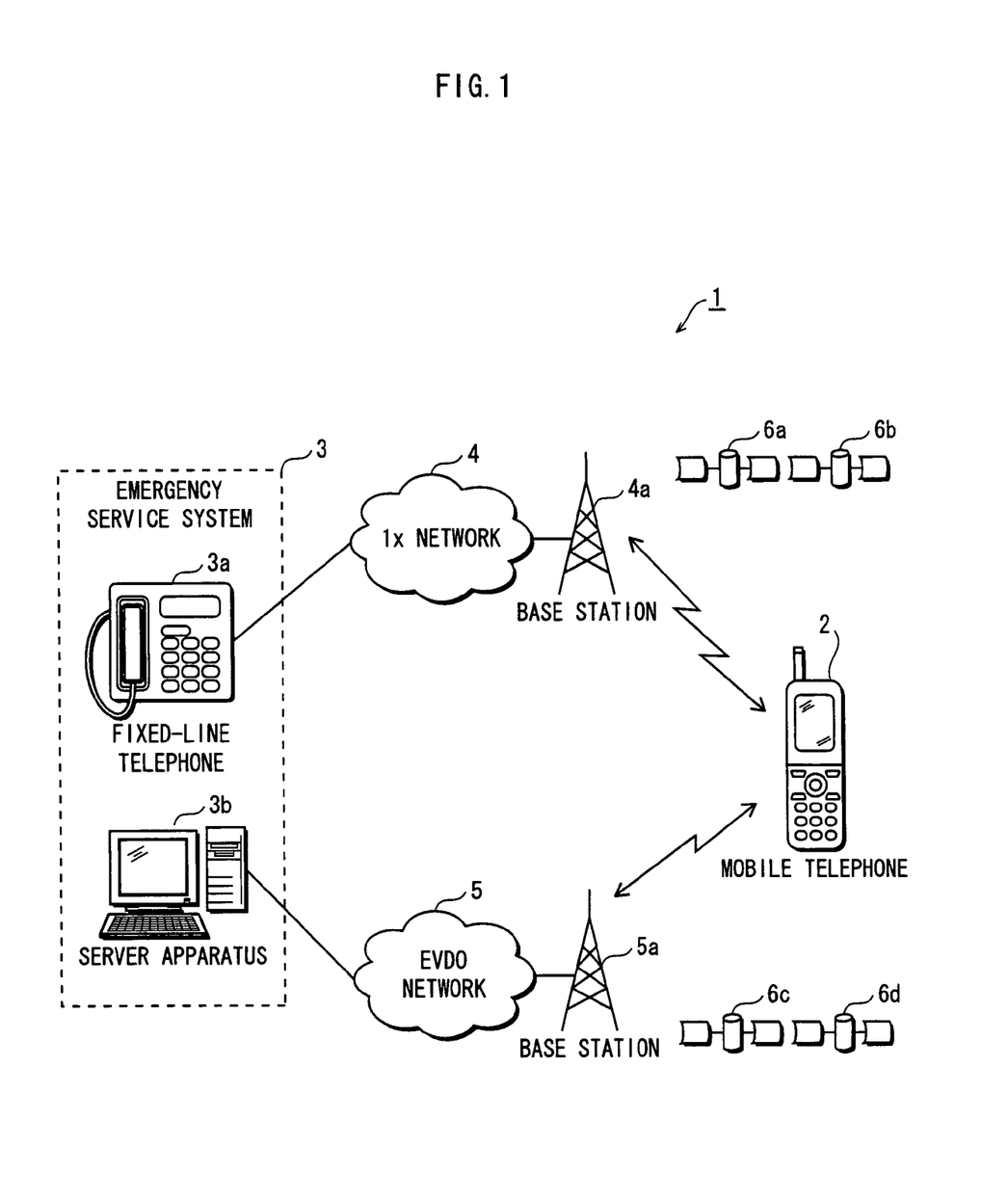
FIG. 1 is a system structural diagram of a mobile telephone system in an embodiment of the present invention.

Referring now to FIG. 1, a description is given of the system structure of a mobile telephone system 1 in an embodiment of the present invention. FIG. 1 is a system structural diagram of the mobile telephone system 1 of the present embodiment.

In the mobile telephone system 1 in FIG. 1, a mobile telephone 2 is a 1×EVDO-enabled mobile telephone. The mobile telephone 2 has a GPS function for acquiring a position (such as latitude, longitude, and altitude) using radio waves emitted from communication satellites 6a, 6b, 6c and 6d. The mobile telephone 2 is wirelessly connected to a 1× network 4 and an EVDO network 5. A base station 4a is provided in the 1× network 4. A base station 5a is provided in the EVDO network 5. Note that a plurality of base stations 4a and a plurality of base stations 5a are provided.

An emergency service system 3 is provided at an emergency service facility. The emergency service system 3 includes a fixed-line telephone 3a connected to the 1× network 4, and a server apparatus 3b connected to the EVDO network 5.

Overview of Mobile Telephone System Operations

Figure 2:
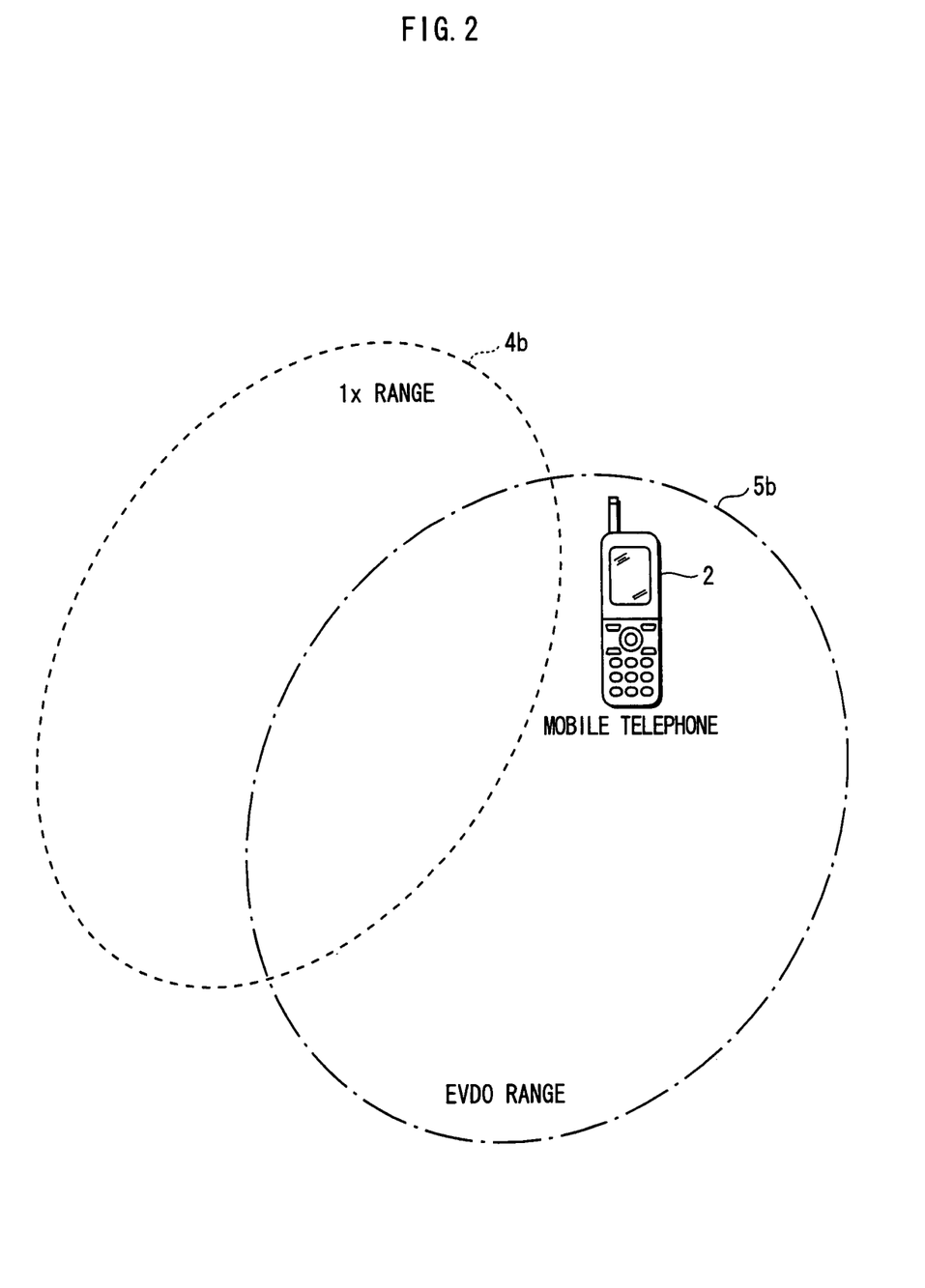
FIG. 2 shows a relationship between an area in which 1× communication can be performed, and an area in which EVDO communication can be performed.

FIG. 1 and FIG. 2 show the operation of the mobile telephone system 1 when the mobile telephone 2 receives an emergency telephone number. In addition, the mobile telephone 2 is outside the range of the 1× network and within the range of the EVDO network.

FIG. 2 shows the relationship between an area in which the mobile telephone 2 can perform communication based on the 1× standard (hereinafter referred to as a 1× range), and an area in which the mobile telephone 2 can perform communication in compliance with the EVDO standard (hereinafter referred to as an EVDO range).

As shown in FIG. 2, a 1× range 4b and an EVDO range 5b do not completely overlap. FIG. 2 illustrates a case in which the mobile telephone 2 is not in the 1× range 4b, but is in the EVDO range 5b.

As shown in FIG. 2, the user of the mobile telephone 2 designates an emergency telephone number and performs a call operation to an emergency service. The mobile telephone 2 attempts to initiate voice communication based on the 1× standard. However, the mobile telephone 2 is unable to initiate voice communication based on the 1× standard because it is outside the 1× range 4b.

The mobile telephone 2 checks whether the telephone number designated by the user (hereinafter referred to as a designated telephone number) is an emergency telephone number that has been stored in advance in a storage unit in the mobile telephone 2. When the mobile telephone 2 has confirmed that the designated telephone number is an emergency telephone number, the mobile telephone 2 checks whether it (the mobile telephone 2) is within the EVDO range 5b.

Having confirmed that it is within the EVDO range 5b, the mobile telephone 2 retrieves an address for a data communication function stored in association with the emergency telephone number in advance in the storage unit. Then, using GPS (global positioning system), the mobile telephone 2 acquires position information showing the current position (such as latitude, longitude and altitude) of the mobile telephone 2.

The mobile telephone 2 then generates an emergency notification message that includes the position information and information showing that the message is emergency notification. Using the address of the emergency service as the destination, the mobile telephone 2 transmits the emergency notification message by data communication based on the EVDO standard.

The emergency notification message transmitted from the mobile telephone 2 reaches the server apparatus 3b in the emergency service system 3 at the emergency service facility via the EVDO network 5 that includes the base station 5a.

The server apparatus 3b displays a map on a display unit. When an emergency notification message is received, the server apparatus 3b displays a mark on the map in a position shown by the position information included in the emergency notification message. As one example, this mark may be displayed as a flashing dot.

Note that in the case that the user designates the emergency telephone number when the mobile telephone 2 is within the 1× range 4b, the following occurs. The mobile telephone 2 sends an emergency call based on the 1× standard. The call reaches the fixed-line telephone 3a in the emergency service system 3 via the 1× network 4 that includes the base station 4a.

Mobile Telephone Structure

Figure 3:
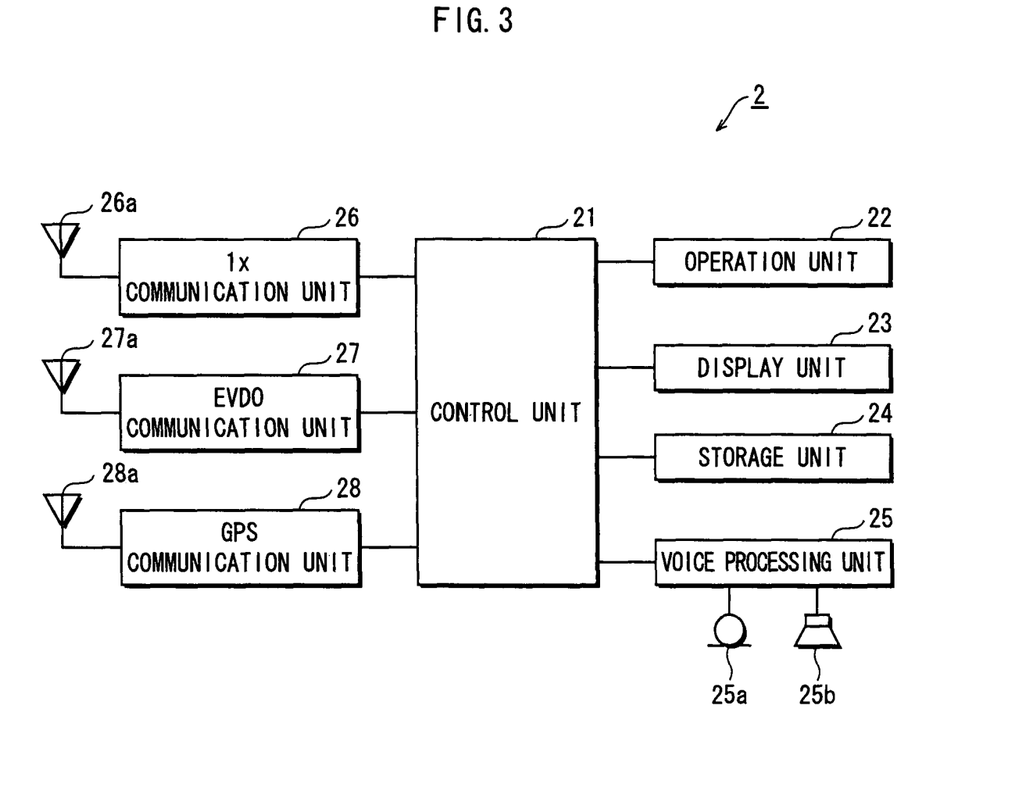
FIG. 3 is a structural diagram of a mobile telephone of FIG. 1.

FIG. 3 is a structural diagram of the mobile telephone 2 of FIG. 1.

The mobile telephone 2 has a control unit 21, an operation unit 22, a display unit 23, a storage unit 24, an voice processing unit 25, a microphone 25a, a speaker 25b, a 1× communication unit 26, an EVDO communication unit 27, a GPS communication unit 28, and antennas 26a, 27a, and 28a.

The control unit 21 performs overall control of the mobile telephone 2. The function of the parts that relate to the present invention are described below.

The operation unit 22 includes keys such as numeric keys and an OK key, and outputs a press signal corresponding to a pressed key to the control unit 21. The user uses the operation unit 22 to perform operations to, for instance, designate and call the emergency telephone number "110" of the emergency service that is the police.

The display unit 23 includes a display and the like, and performs display of display data input from the control unit 21.

The storage unit 24 stores therein various control programs for controlling the mobile telephone 2, and application software and the like. In addition, a storage area for storing an emergency service table is allocated in the storage unit 24. One example of this emergency service table is shown in FIG. 4.

Figure 4:
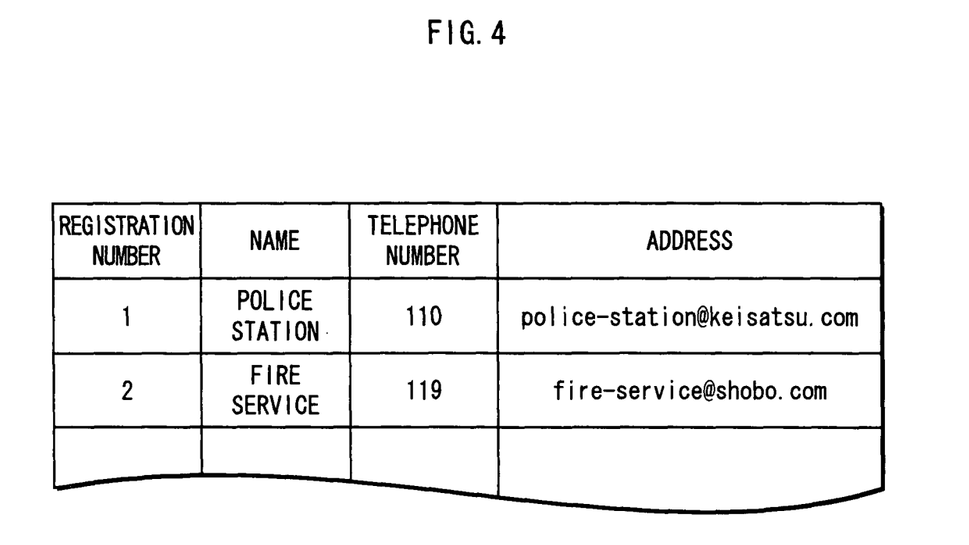
FIG. 4 shows an emergency service table stored in a storage unit of FIG. 3.

The emergency service table shown in FIG. 4 has a plurality of fields, namely "registration number", "name", "telephone number", and "address". Stored in the "name" field are the names of emergency services. Stored in the "telephone number" field are emergency telephone numbers allocated to the emergency services for 1× network communication. Furthermore, stored in the "address" field are addresses allocated to the emergency services for EVDO network communication.

The voice processing unit 25 converts a digital signal input from the control unit 21 into an analog signal, and outputs the analog signal to the speaker 25b. The speaker 25b outputs the voice signal input from the voice processing unit 25. The microphone 25b gathers sound from around the microphone 25b, and outputs the gathered sound to the voice processing unit 25. The voice processing unit 25 converts the analog signal input from the microphone 25a into a digital signal, and outputs the digital signal to the control unit 21.

The 1× communication unit 26 is a communication unit for communication based on the 1× standard. The 1× communication unit 26 performs transmission and reception of signals via the antenna 26a with other devices connected to the 1× network 4. The 1× communication unit 26 outputs a reception signal received via the antenna 26a to the control unit 21, and also via the antenna 26a, sends a transmission signal input from the control unit 21.

The EVDO communication unit 27 is a communication unit for communication based on the EVDO standard. The EVDO communication unit 27 performs transmission and reception of signals via the antenna 27a with other devices connected to the EVDO network 5. The EVDO communication unit 27 outputs a reception signal received via the antenna 27a to the control unit 21, and also via the antenna 27a, transmits a transmission signal input from the control unit 21.

The GPS communication unit 28 receives, by way of the antenna 28a, radio waves emitted by four communication satellites that are included in the GPS, and outputs the received radio waves to the control unit 21.

Control Unit Structure

Figure 5:
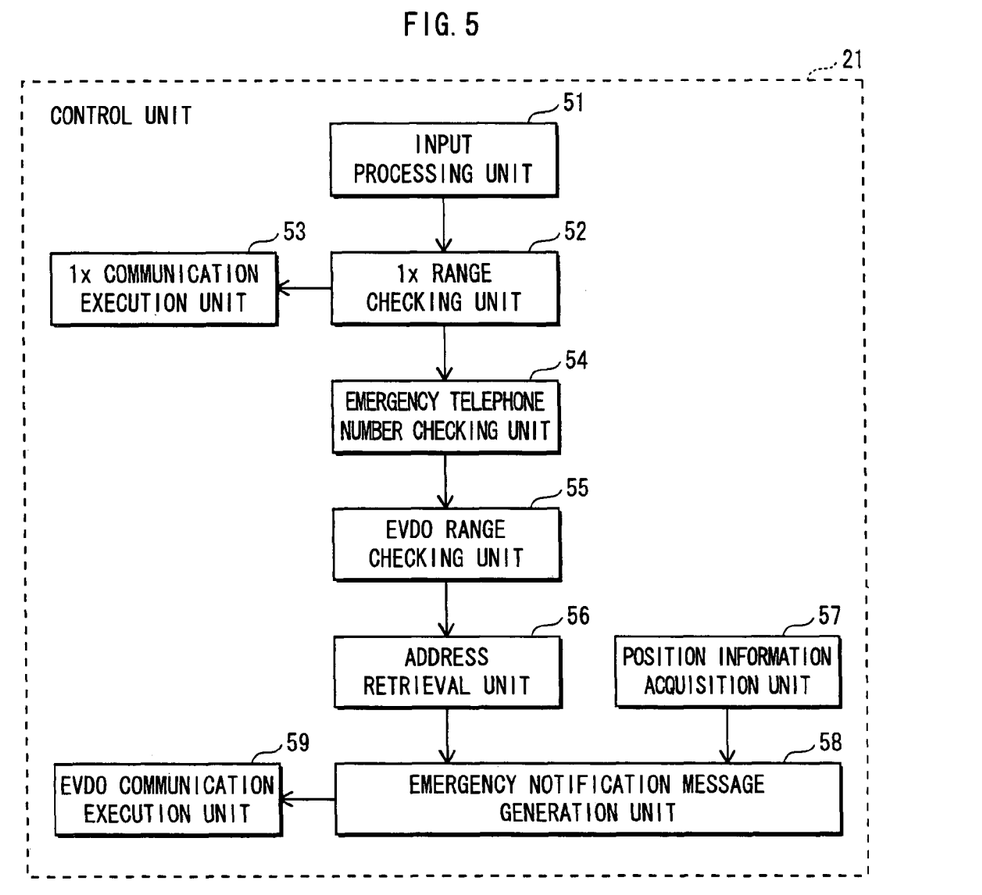
FIG. 5 is a function block diagram of the control unit of FIG. 3.

FIG. 5 is a function block diagram of the mobile telephone of FIG. 3.

The control unit 21 has an input processing unit 51, a 1× range checking unit 52, a 1× communication execution unit 53, an emergency telephone number checking unit 54, an EVDO range checking unit 55, an address retrieval unit 56, a position information acquisition unit 57, an emergency notification message generation unit 58, and an EVDO communication execution unit 59.

The input processing unit 51 performs analysis of the content of input based on a key press signal input from the operation unit 22. When the content of the input is telephone number input and a call operation, the input processing unit 51 outputs the telephone number shown by the content of the input to the 1× range checking unit 52.

The 1× range checking unit 52 checks whether the mobile telephone 2 is within the range of the 1× network 4, in other words, whether or not voice communication in compliance with the 1× standard is possible. When it is confirmed that the mobile telephone 2 is within the range of the 1× network 4, in other words, that it is possible for the mobile telephone 2 to perform voice communication according to 1×, the 1× range checking unit 52 outputs the telephone number input from the input processing unit 51 to the 1× communication execution unit 53. When it is confirmed that the mobile telephone 2 is outside the range of the 1× network 4, in other words, that it is not possible for the mobile telephone 2 to perform voice communication according to 1×, the 1× checking range unit 52 outputs the telephone number input from the input processing unit 51 to the emergency telephone number checking unit 54.

The 1× communication execution unit 53, for instance, performs processing such as processing necessary to initiate voice communication, one example being call processing based on the telephone number input from the 1× range checking unit 52. The 1× communication execution unit 53 performs processing for transmitting and receiving voice with a device of another party.

The emergency telephone number checking unit 54 checks whether or not the telephone number input from the 1× range checking unit 52 is in the "telephone number." field in the emergency service table in the storage unit 24. In other words, the emergency telephone number checking unit 54 checks whether or not the telephone number input from the 1× range checking unit 52 is an emergency telephone number of an emergency service. When it is confirmed that the telephone number is in the "telephone number" field in the emergency service table, the emergency telephone number checking unit 54 outputs the telephone number (the telephone number of one of the emergency services) to the EVDO range checking unit 55.

The EVDO range checking unit 55 checks whether or not the mobile telephone 2 is within the range of the EVDO network 5, in other words, whether or not it is possible for the mobile telephone 2 to perform data communication in compliance with the EVDO standard. When it is confirmed that the mobile telephone 2 is within the range of EVDO network 5, in other words that it is possible for the mobile telephone 2 to perform data communication according to EVDO, the EVDO range checking unit 55 outputs the emergency telephone number input from the emergency telephone number checking unit 54 to the address retrieval unit 56.

The address retrieval unit 56 retrieves, from the emergency service table in the storage unit 24, a record in the "telephone number" field having a value that matches the emergency telephone number input from the EVDO range checking unit 55. The address retrieval unit 56 retrieves the value of the "address" field in the retrieved record. The address retrieval unit 56 then outputs, to the emergency notification message generation unit 58, the address retrieved from the emergency service table (the address assigned to the emergency service to which the emergency telephone number input by the user is assigned).

The position information acquisition unit 57 calculates the current position of the mobile telephone 2 based on radio waves emitted by four communication satellites and input from the GPS communication unit 28. The position information acquisition unit 57 outputs position information showing the calculated current position of the mobile telephone 2 to the emergency notification message generation unit 58.

The emergency notification message generation unit 58 generates an emergency notification message. The emergency notification message includes the position information input from the position in formation acquisition unit 57 and information showing that the message is emergency notification. The emergency notification message generation unit 58 incorporates the address input from the address retrieval unit 56 to the emergency notification message as the destination thereof. The emergency notification message generation unit 58 then outputs the generated emergency notification message to the EVDO communication execution unit 59.

The EVDO communication execution unit 59 receives input of the emergency notification message from the emergency notification message generation unit 58. The EVDO communication execution unit 59 executes processing for transmitting, according to data communication that complies with the EVDO standard, the emergency notification message to a device assigned the address added to the emergency notification message as the destination. As a result, the emergency notification message is sent via the EVDO communication unit 27 and the antenna 27a, and reaches the server apparatus 3b of the emergency service system 3 via the EVDO network 5 that includes the base station 5a.

Server Apparatus Structure

Figure 6:
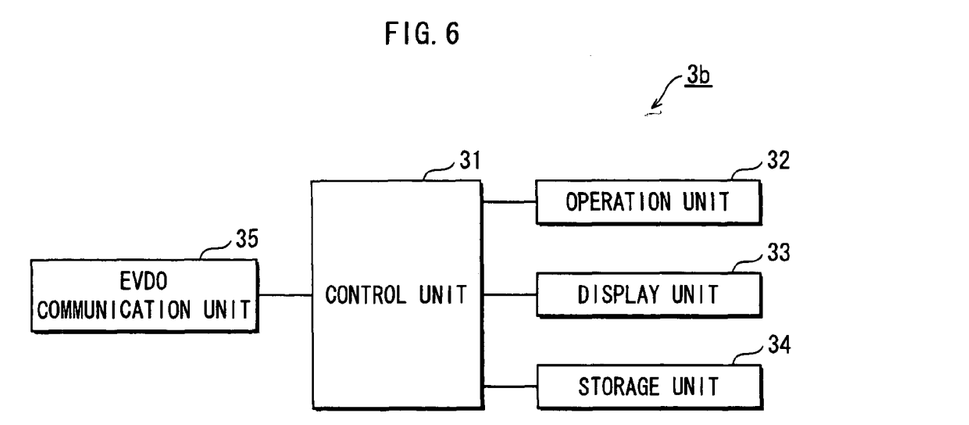
FIG. 6 is a structural diagram of the server apparatus of FIG. 1.

FIG. 6 is a structural diagram of the server apparatus 3b of FIG. 1.

The server apparatus 3b has a control unit 31, an operation unit 32, a display unit 33, a storage unit 34, and an EVDO communication unit 35.

The control unit 31 performs overall control of the server apparatus 3b. In the present embodiment, the control unit 31 outputs map data of an area supported by the emergency service, to the display unit 33 as display data. The control unit 31 also monitors whether or not an emergency notification message is received by the EVDO communication unit 35. Upon detecting that an emergency notification message has been received, the control unit 31 outputs, to the display unit 33, display data for displaying a mark on the map in a position shown by the position information included in the emergency notification message.

The operation unit 32 includes keys such as numeric keys and an OK, and outputs a press signal corresponding to a pressed key to the control unit 31.

The display unit 33 is composed of a display and the like, and performs display of display data input from the control unit 31.

The storage unit 34 stores therein various control programs for controlling the server apparatus 3a, application software and the like, and also map data of the area supported by the emergency service.

The EVDO communication unit 35 is a communication unit for communication based on the EVDO standard. The EVDO communication unit 35 performs transmission and reception of signals with other devices connected to the EVDO network 5. The EVDO communication unit 35 outputs a reception signal to the control unit 11, and transmits a transmission signal input from the control unit 31 to the EVDO network 5.

Communication Operations of the Mobile Telephone

Figure 7:
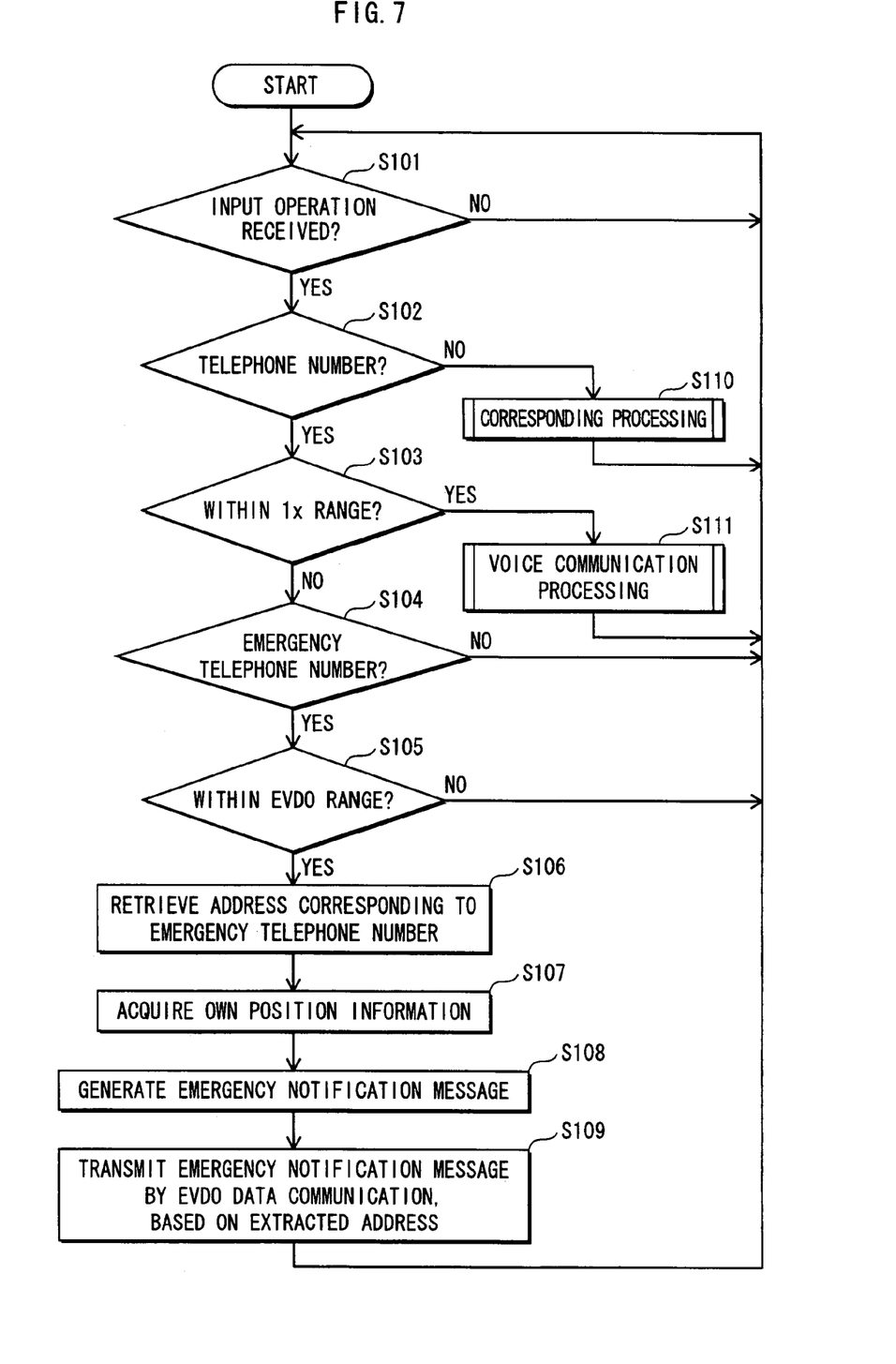
FIG. 7 is a flowchart showing the flow of communication operations of the mobile telephone of FIG. 1.

FIG. 7 is a flowchart showing the flow of communication operations of the mobile telephone 2 of FIG. 1.

The input processing unit 51 judges whether or not an input operation has been performed by the user, according to whether or not a press signal has been input from the operation unit 22 (step S101). When an input operation has not been performed (S101: NO), the input processing unit 51 returns to the processing at step S101.

When an input operation has been performed (S101: YES), the input processing unit 51 judges whether or not the input operation based on the press signal input from the operation unit 22 is an operation relating to designation of a telephone number and a call (hereinafter such as operation is referred to as a call initiation operation). When it is judged that the input operation is not a call initiation operation (S102: NO), the mobile telephone 2 proceeds to the processing at step S110, and performs processing corresponding to the input operation (step S110).

When it is judged that the input operation is a call initiation operation (S102: YES), the 1× range checking unit 52 checks whether or not the mobile telephone 2 is within the range of the 1× network 4. In other words, the 1× range checking unit 52 checks whether or not it is possible for the mobile telephone 2 to perform voice communication in compliance with the 1× standard (step S103). When, as a result of the checking, it is confirmed that the mobile telephone 2 is within the range of the 1× network 4 (S103: YES), the 1× communication execution unit 53 performs voice communication processing such as call processing based on the telephone number (designated telephone number) input according to the call initiation operation (step S111). As a result, when, for instance, the designated telephone number is an emergency telephone number, the emergency call issued from the mobile telephone 2 reaches the fixed-line telephone 3a of the emergency service system 3 via the 1× network 4 that includes the base station 4a.

When, as a result of the checking, it is confirmed that the mobile telephone 2 is outside the range of the 1× network 4 (S103: NO), the emergency telephone number checking unit 54 refers to the emergency service table stored in the storage unit 24, to check whether or not the designated telephone number is an emergency telephone number (step S104). When, as a result of the checking, it is confirmed that the designated telephone number is not an emergency telephone number (S104: NO), the mobile telephone 2 returns to the processing at step S101.

When, as a result of the checking, it is confirmed that the designated telephone number is an emergency telephone number (S104: YES), the EVDO range checking unit 55 checks whether or not the mobile telephone 2 is within the range of the EVDO network 5. In other words, the EVDO range checking unit 55 checks whether or not it is possible for the mobile telephone 2 to perform data communication in compliance with the EVDO standard (step S105). When, as a result of the checking, it is found that the mobile telephone 2 is outside the range of the EVDO network 5 (S105: NO), the mobile telephone 2 returns to the processing at step S101.

When, as a result of the checking, it is confirmed that the mobile telephone 2 is within the range of the EVDO network 5 (S105: YES), the address retrieval unit 56 refers to the emergency service table stored in the storage unit 24 to retrieve the address (hereinafter referred to as an retrieved address) stored in correspondence with the designated telephone number (an emergency telephone number here) from the emergency service table (step S106).

The position information acquisition unit 57 acquires position information showing the current position (such as latitude, longitude, altitude) of the mobile telephone 2 (step S107).

The emergency notification message generation unit 58 generates an emergency notification message. The emergency notification message includes the position information showing the position of the mobile telephone 2 and information showing that the message is emergency notification. The emergency notification message generation unit 55 also incorporates the retrieved address to the emergency notification message as the destination (step S108).

The EVDO communication execution unit 59 executes, according to data communication in compliance with the EVDO standard, transmission of the emergency notification message to the device assigned the retrieved address attached to emergency notification message as the destination (step S109). The mobile telephone 2 returns to the processing at step S101. As a result, the emergency notification message issued from the mobile telephone 2 reaches the server apparatus 3b of the emergency service system 3 via the EVDO network 5 that includes the base station 5a.

The display unit 33 of the server apparatus 3b displays a map of the area supported by the emergency service. Having confirmed that an emergency notification message has been received by the EVDO communication unit 35, the control unit 31 of the server apparatus 3b displays a mark on the map in a position shown by the position information included in the emergency notification message.

According to the described embodiment, when it is not possible for the mobile telephone 2 to perform voice communication to another party, the mobile telephone 2 can automatically transmit an emergency notification message to the address of the other party to which voice communication was intended to be initiated. Since an emergency notification message is transmitted to the device of the other party, the user is not burdened with an additional task.

According to the described embodiment, since it is not necessary for the user to perform an additional task, the amount of time taken for the emergency notification message to reach the device of the other party can be reduced.

According to the described embodiment, since the position information of the mobile telephone 2 acquired by the position information acquisition unit 57 is automatically incorporated in the emergency notification information, it is not necessary for the user to perform the task of notifying his position to the other party.

Although an example of two types of communication methods, namely the 1× system and the EVDO system, are given in the described embodiment, the two types of communication methods are not limited to the described two, and a case such as the following is suitable.

Namely, it is suitable for there to be two types of communication methods, one being a communication method by which voice communication is possible (hereinafter referred to as a first communication method) and the other being a communication method by which data communication is possible (hereinafter referred to as a second communication method), and at least part of the area in which the mobile terminal can perform communication using the second communication method to be included in the area in which the mobile terminal can perform communication using the first communication method.

One example of a communication system by which data communication is possible is a wireless LAN (local area network).

Although an example of the mobile telephone 2 transmitting an emergency notification message once is given in the described embodiment, the mobile telephone 2 is not limited to transmitting the emergency notification message only once, and may transmit the emergency notification message a plurality of times, with a predetermined period of time between each transmission.

This means that even if, for instance, the emergency notification message is lost on the communication path, another of the emergency notification messages is likely to reach the device of the other party. Accordingly, when the emergency notification message is transmitted a plurality of times, the probability of the emergency notification message reaching the other party is higher than when the emergency notification message is transmitted only once.

Alternatively, the mobile telephone 2 may re-transmit the emergency notification message if an ACK signal is not received from the base station in response to the emergency notification message within a predetermined period of time.

Although an example of the mobile telephone using GPS as a technique for acquiring position information showing its current position is described in the above embodiment, the technique used is not limited to being GPS. Any technique by which the position of the mobile telephone can be acquired may be applied to the present invention. An example of such a technique is calculating the position of the mobile telephone using respective distances between the mobile telephone and a plurality of base stations.

Although an example of one server apparatus 3b being provided at the emergency service facility is described in the above embodiment, the number of server apparatuses is not limited to one. A plurality of server apparatuses may be provided at the emergency service facility, and the address of each server apparatus may be stored in the emergency service table of FIG. 4. The mobile telephone may use each address to send an emergency notification message that includes the position information. This means that even if one of the server apparatuses is down, another server apparatus receives the emergency notification message. This is effective in emergency situations in which it is imperative that the message reaches the other party.

Although in the above embodiment an example of the mobile telephone being outside the range of the 1× network is described as a circumstance under which it is not being possible for the mobile telephone to perform communication in compliance with the 1× standard, the circumstance is not limited to the described example. The circumstance may, for instance, be a partial malfunction in the mobile telephone that prevents the mobile telephone from performing communication in compliance with the 1× standard.

Although an example of a switch from communication in compliance with the 1× standard to communication in compliance with the EVDO standard being made when the other party is an emergency service is described in the above embodiment, the case in which such a switch is made is not limited to a case of emergency, and the message transmitted to the other party is not limited to being an emergency notification message.

A program in which is written a processing procedure equivalent to the processing described in the above embodiment may be stored in a memory, and the processing may be performed using a CPU (central processing unit) or the like. Furthermore, the program may be recorded on a computer-readable recording medium such as a CD-ROM.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A mobile telephone including a voice communication function for performing voice communication and a data communication function for performing data communication, the mobile telephone comprising:
   a storage unit operable to store a telephone number and an address for the data communication function;
   a determination unit operable to determine whether the mobile telephone located outside a range of a voice communication area;
   a voice communication execution unit operable to execute processing for voice communication using the telephone number stored in the storage unit when the determination unit determines that the mobile telephone is located within the range of the voice communication area;
   a retrieval unit operable to retrieve the address stored in the storage unit when the determination unit determines that the mobile telephone is located outside the range of the voice communication area; and
   an execution unit operable to cause a message to be transmitted by way of the data communication function using the retrieved address as a destination.

2. The mobile telephone of claim 1, further comprising:
   an acquisition unit operable to acquire position information,
   wherein the execution unit performs the transmission of the message with the acquired position information incorporated in the message.

3. The mobile telephone of claim 1, wherein
   the stored telephone number is a telephone number of an emergency service, and the stored address is an address of the emergency service.

4. The mobile telephone of claim 1, wherein
   the execution unit executes the transmission of the message a plurality of times.

5. A notification method used by a mobile telephone that includes a voice communication function for performing voice communication and a data communication function for performing data communication, and a storage unit operable to store a telephone number and an address for the data communication function, the notification method comprising:
   determining whether the mobile telephone is located outside a range of a voice communication area;

executing processing for voice communication using the telephone number stored in the storage unit when the mobile telephone is determined to be located within the range of the voice communication area;

the address stored in the storage unit when, the mobile telephone is determined to be located outside the range of the voice communication area; and causing a message to be transmitted-by way of the data communication function using the retrieved address as a destination.

6. A non-transitory computer-readable medium storing computer-executable instructions thereon that, when executed by a mobile telephone that includes a voice communication function for performing voice communication and a data communication function for performing data communication, and a storage unit operable to store a telephone number and an address for the data communication function, perform a process of:

determining whether the mobile telephone is located outside a range of a voice communication area;

executing processing for voice communication using the telephone number stored in the storage unit when, in the determination step, the mobile telephone is determined to be located within the range of the voice communication area;

retrieving the address stored in the storage unit when the mobile telephone is determined to be located outside the range of the voice communication area; and causing a message to be transmitted by way of the data communication function using the retrieved address as a destination.

* * * * *